No. 875,277. PATENTED DEC. 31, 1907.
G. W. MEYER.
ROTARY VALVE FOR AIR COMPRESSORS.
APPLICATION FILED MAR. 5, 1907.
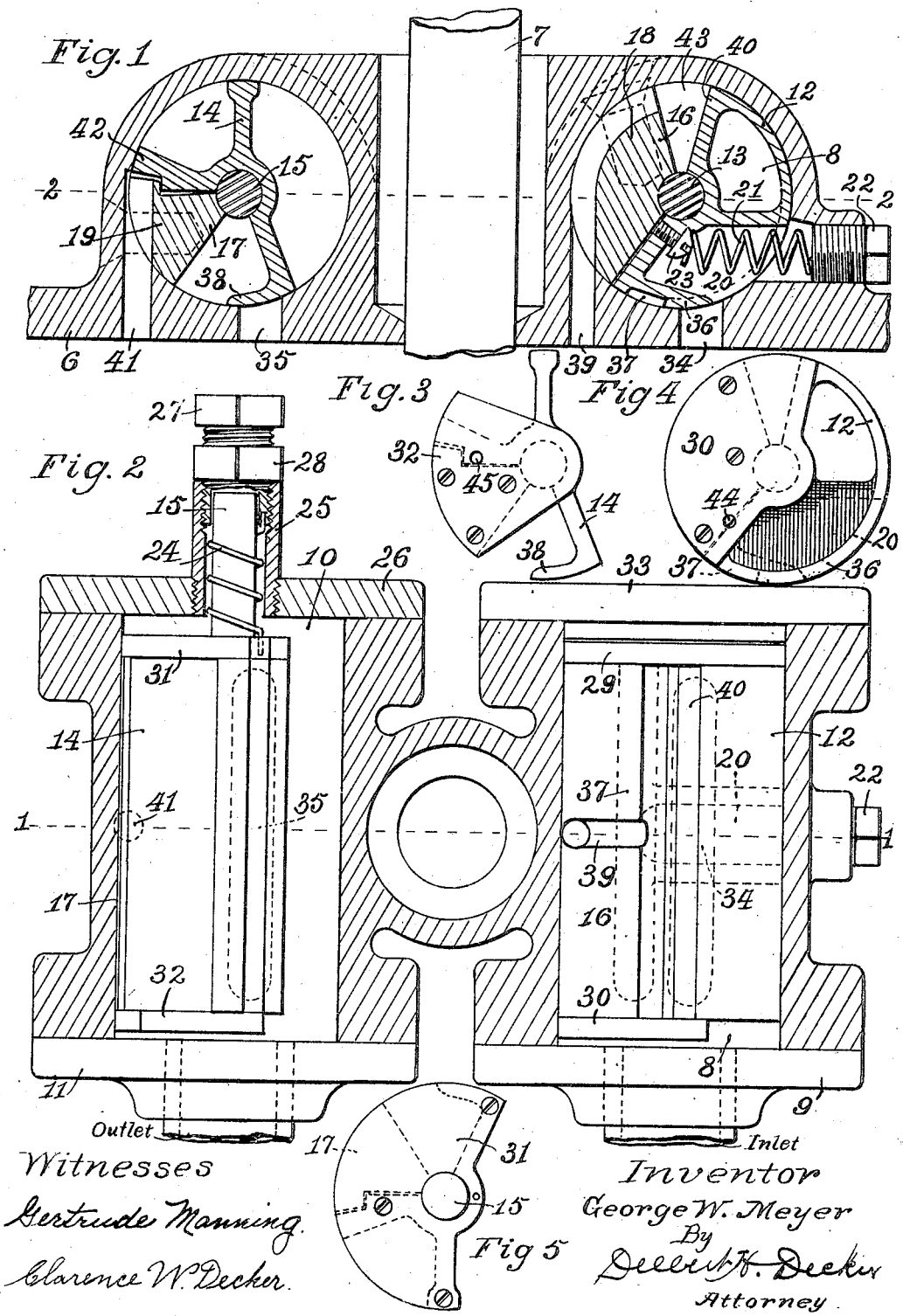
Witnesses
Gertrude Manning
Clarence W. Decker
Inventor
George W. Meyer
By
Dellett H. Decker
Attorney

UNITED STATES PATENT OFFICE.

GEORGE W. MEYER, OF SPARROWS POINT, MARYLAND.

ROTARY VALVE FOR AIR-COMPRESSORS.

No. 875,277.　　　　Specification of Letters Patent.　　　Patented Dec. 31, 1907.

Application filed March 5, 1907. Serial No. 360,750.

*To all whom it may concern:*

Be it known that I, GEORGE W. MEYER, a citizen of the United States, residing at Sparrows Point, in the county of Baltimore and State of Maryland, have invented certain new and useful Improvements in Rotary Valves for Air-Compressors, of which the following is a specification.

This invention relates to rotary valves designed for use on air compressers and to that class of such rotary valves wherein the opening of the valves is directly effected by the pressure of the air.

The principal objects of the invention are the provision of automatic valves of this sort which can be constructed with great simplicity and accuracy, which may readily be removed, which shall be light and therefore easily operated, whose movements shall occur when subject to the minimum pressure, and whose longevity shall be great in comparison with most compressor valves now in use.

With these objects in view the invention consists in the structure and in the combination of parts constituting the same substantially as hereinafter described and claimed.

In the accompanying drawing, which forms a part of this specification, Figure 1 represents a transverse section of the air pressure valves and valve chambers taken in the plane indicated by line 1—1, of Fig. 2; Fig. 2 represents a partially sectionized plan of the valves and valve casings, the section being taken in the plane indicated by the line 2—2 in Fig. 1; Fig. 3 is an end elevation of the elements within the outlet valve chamber; Fig. 4 is a like view of the elements within the inlet valve chamber and Fig. 5 is an elevation of the elements in the outlet valve chamber viewed from the end opposite to that represented in Fig. 3.

The invention involves the use of separate valves for controlling the inlet and outlet of the air pressure cylinder and by preference are located on or in one head of said cylinder. The drawings illustrate these valves as located in chambers formed in the metal of a cylinder head. Such cylinder head is indicated at 6. Only the portion of the head containing the valves is shown, and that shown alone in Fig. 1. In Fig. 2 nothing of the cylinder head below the plane of section is shown. At 7 the piston rod is represented as passing through a stuff-box formed between the two valve chambers.

8 indicates the inlet valve chamber, through the head 9 of which the air to be compressed is admitted, and 10 indicates the outlet chamber, through the head 11 of which the compressed air is passed to the receiver or other part of a compressed air system. The inlet valve is indicated at 12 and consists of a cylindrical segment fitted to the chamber 8 and having at its axis a rod 13, preferably of brass. The outlet valve is indicated at 14 and consists of a skeleton cylindrical segment having also at its center a rod 15, preferably of brass. Within the valve chambers are stationary segmental abutments 16 and 17, along the apexes of which are formed bearings for the axial rods 13 and 15. These abutments are preferably cast and turned to accurately fit the bored out cylindrical valve chambers and are then fixed in said chambers by means of screws, as indicated at 18 and 19 respectively.

The rotary valves are preferably made in skeleton form as indicated, in order that they may be as light as is compatible with durability, whereby they may be the more readily started and stopped. This skeletonizing of the valves may be produced in various ways, but preferably it is effected at the time of casting, either by proper coring or otherwise as is found most convenient or necessary. The fact that only the parts of the valves coming in engagement with the walls of their chambers are necessary to be made smooth, permits the valves to be cast and these outer surfaces turned up with the necessary accuracy to fit them to their respective chambers. Their centers may also be accurately bored to receive the rods 13 and 15. In making the inlet valve 12 a chamber, as 20, is formed transversely thereof to receive the spring 21, whose function is to close the valve. This chamber 20, as indicated by dotted lines in Fig. 2, is preferably made at the middle of the valve and has no communication with any portion of the valve chamber, though it may, as shown in Fig. 1, communicate with the interior of the cylinder. Access to this chamber for the insertion of the spring 21, is preferably had through a lateral opening closed by the screw plug 22, which plug serves also in adjusting the tension of the spring 21. The inner end of said spring is given a bearing against one side of the hub valve, as by resting its end against a screw 23 inserted in the lower wing of said valve.

The outlet valve 14 is preferably closed by means of a spring 24 arranged in the axial line of the outlet chamber. To effect this the axial rod 15 is preferably extended beyond the valve into a tube 25 inserted in the head 26 of the outlet chamber, and into this tube is turned a screw 27, having a hollow stem to receive the rod 15. One end of the spring 24 is attached to the screw 27 and the other to a plate on the end of valve 14. A jamnut, as 28 is preferably applied to the screw 27 to hold said screw in the position to which it is turned when adjusting the tension of the screw 23. While it is preferable to use the springs 21 and 24, as here shown and described, either form may be adopted for both valves.

For the retention of the valves approximately in a definite longitudinal position, and to facilitate the manufacture of the valves, and of their respective abutments, end plates are provided and preferable these are of brass or bronze. To one end of the inlet valve 12 is attached a circular plate 29, which bears against the end of the abutment 18 and to the opposite end of said abutment is attached the plate 30, which overlaps portions of the valve, as indicated in Fig. 4. To one end of the outlet valve is attached the plate 31, which bears against the end of the abutment 14 and to the opposite end of said abutment is attached the plate 32, which overlaps portions of the valve 14. The inward extension on the end plate 33 of the inlet chamber provides one limit to the longitudinal movement of valve 12, and the plate 30 the other, while in the outlet valve the spring 24 keeps the valve against the plate 32.

The port of communication leading from the valve chamber 8 through the head 6 into the cylinder is indicated at 34, and the port of communication from the cylinder into the outlet chamber through the head 6, is indicated at 35. The former of these ports is closed by the wall 36 of the inlet valve, through which wall is formed the port 37, which provides for the passage of the air from the inlet chamber through port 34. The port 35 is closed by the extension on the lower wing of the outlet valve 14.

The valves are both opened by variations of pressure and closed by the springs. To effect this opening a connection between the cylinder and the valve chamber 8 is made through a port 39, which extends through the head 6 and the abutment 16 and opens against the wing 40 of valve 12. In the outlet valve the controlling port 41 extends through the cylinder head 6 and the abutment 18 and opens against the wing 42 of valve 14.

The operation of the valves is as follows: As the piston recedes from the head 6, the air behind it and that within the compartment 43 is rarefied until the atmospheric pressure in chamber 8 overcomes the tension of spring 21, when valve 12 will rotate counter clockwise and bring the port 37 over port 34, thereby permitting the air to flow into the cylinder. As soon as the piston reaches the limit of its recession, and before it can start on its return movement, the tension of the air in the cylinder will drop sufficiently to permit the spring 21 to close the inlet valve. Then as the piston returns, the air compressed by it will act through port 41, open wing 42 of the outlet valve, and when the compression has reached a point sufficiently exceeding that of the air in the receiver and the tension of spring 24, valve 14 will rotate clockwise and open port 35, thereby allowing the air to escape from the cylinder through the outlet chamber and the outlet thereof in head 11 to the receiver. When the piston has reached its return limit the pressure in the cylinder and in the outlet chamber approach equality and the spring 24 closes the valve 14.

Cushioning devices may be adopted to retard stopping of the valves. One form of such device for the inlet valve indicated, consists in making a hole as 44, Fig. 4, through plate 30 at a point such that it will communicate with the space between the lower wing of valve 12 and the lower surface of abutment 16, whereby as the valve closes the air caught in this chamber can escape only as the area of said opening will permit. A similar result is attained at the outlet valve by making a hole 45 through plate 32 into the chamber formed between an offset of the wing 42 of valve 14 and a depression in the upper surface of the abutment 17.

The invention claimed is:—

1. In an air compressor, the combination with the compressor cylinder of a rotary valve constructed with radial wings and inclosed within a cylindrical valve chamber, and an abutment within said chamber, an air chamber being formed between said abutment and one of said wings, and said chamber being provided with a port in communication with the interior of said cylinder for the passage of air through the compressor and another port also in communication with the interior of said cylinder and opening into said air chamber, whereby through varying pressure the valve may be opened.

2. In an air compressor, the combination of a cylindrical valve chamber having a principal port communicating with the compressor cylinder and having an auxiliary port, a rotary valve fitted to said chamber and controlling said principal port, and having a wing forming a wall of the compartment into which said auxiliary port opens for the purpose specified, and a spring for rotating the valve into closed position.

3. In an air compressor, the combination of a cylindrical valve chamber having a port communicating with the compressor cylinder, a rotary valve fitted to said chamber, and having a wing forming a wall of the compartment into which said port opens and a spring located transversely of the valve chamber and bearing tangentially on the hub of the valve whereby to rotate the valve into closed position.

4. In an air compressor, the combination with the compressor cylinder, of rotary inlet and outlet valves in cylindrical valve chambers formed in the head of said cylinder and each chamber provided with a port communicating through the head with the cylinder for the passage of air through the compressor, and another port also communicating through the head with the cylinder and opening against a wing of the respective valve, whereby through varying pressure the valve may be opened.

5. In a compressor valve, the combination of a cylindrical chamber, a stationary segmental abutment fixed along one side of said chamber and having a journal bearing along its edge near the center of the chamber, and a segmental valve in said chamber having a rod extending from end to end thereof through its axis and serving as a journal in the bearing upon said abutment for the purpose set forth.

6. In a compressor valve, a cylindrical chamber, a stationary segmental abutment therein, a segmental valve in said chamber, a plate secured to one end of the valve and extending across the adjacent end of the abutment, and another plate secured to the opposite end of the abutment and overlapping a portion of the adjacent end of the valve.

7. In a compressor valve, a cylindrical chamber, a stationary segmental abutment therein, a segmental valve in said chamber, a plate secured to one end of the valve and extending across the adjacent end of the abutment, and another plate secured to the opposite end of the abutment and overlapping a portion of the adjacent end of the valve, the latter plate being provided with a vent hole, whereby to assist in cushioning the closing of the valve.

8. The combination with a compressor cylinder, of a pair of cylindrical valve chambers formed on a head of the cylinder, each chamber having removable ends, and an air inlet through a head of one chamber and an outlet for the compressed air through a head of the other chamber, rotary valves in said chambers controlling the passage of air through said inlet and said outlet, means for opening said valves by air pressure acting directly thereon and means acting independently of the moving parts of the compressor for closing said valves.

9. The combination with a compressor cylinder, of a pair of cylindrical valve chambers formed on a head of the cylinder, each chamber having removable ends, and an inlet through the end of one chamber and an outlet for the compressed air through a head of the other chamber, rotary air actuated valves in said chambers, a spring arranged transversely of the inlet chamber for closing the inlet valve and a spring in the axial line of the outlet chamber for closing the outlet valve.

In testimony whereof I have signed my name to this specification in the presence of two subscribing witnesses.

GEORGE W. MEYER.

Witnesses:
  GEO. H. WOOD,
  TROW WOODRUFF.